(12) United States Patent
Shum et al.

(10) Patent No.: US 6,751,407 B2
(45) Date of Patent: Jun. 15, 2004

(54) CAMERA FILM CASSETTE ASSEMBLY APPARATUS AND METHOD

(75) Inventors: Ivan W. K. Shum, New Territories (HK); Roland Walter Kohl, New Territories (HK)

(73) Assignee: Hi-Lite Camera Company Limited, Hong Kong (HK)

( * ) Notice: Subject to any disclaimer, the term of this patent is extended or adjusted under 35 U.S.C. 154(b) by 137 days.

(21) Appl. No.: 10/081,136

(22) Filed: Feb. 22, 2002

(65) Prior Publication Data

US 2003/0161627 A1 Aug. 28, 2003

(51) Int. Cl.$^7$ .............................................. G03B 17/02
(52) U.S. Cl. ............................ 396/6; 396/513; 396/538
(58) Field of Search .......................... 396/6, 511–513, 396/538

(56) References Cited

U.S. PATENT DOCUMENTS

| | | |
|---|---|---|
| 4,833,495 A | 5/1989 | Ohmura et al. |
| 4,855,774 A | 8/1989 | Ohmura et al. |
| 4,884,087 A | 11/1989 | Mochida et al. |
| 4,954,857 A | 9/1990 | Mochida et al. |
| 4,972,649 A | 11/1990 | Mochida et al. |
| 5,063,400 A | 11/1991 | Takei et al. |
| RE34,168 E | 1/1993 | Ohmura et al. |
| 5,235,364 A | 8/1993 | Ohmura et al. |
| D345,750 S | 4/1994 | Arai |
| 5,361,111 A | 11/1994 | Yamashina et al. |
| 5,381,200 A | 1/1995 | Takagai |
| D356,101 S | 3/1995 | Arai |
| 5,408,288 A | 4/1995 | Ogura et al. |
| 5,436,685 A | 7/1995 | Yamashina |
| 6,249,646 B1 * | 6/2001 | Chen ................................ 396/6 |
| 6,522,835 B2 * | 2/2003 | So et al. ........................... 396/6 |

* cited by examiner

Primary Examiner—David M. Gray
(74) Attorney, Agent, or Firm—Armstrong Teasdale LLP (57) ABSTRACT

An apparatus and method for installing film into a detachable film cassette assembly including a film clip adapted to receive a film cartridge, a winding housing attached to the film clip, and first and second film covers. The method includes coupling the film cartridge to the film clip, inserting the film clip into the first film cover, inserting the second film cover over the film clip, and engaging the first and second film covers to at least partially enclose the film clip between the winding housing and the film cartridge.

25 Claims, 10 Drawing Sheets

CAMERA FILM CASSETTE ASSEMBLY APPARATUS AND METHOD

BACKGROUND OF THE INVENTION

This invention relates generally to cameras, and more particularly, to a detachable film cassette assembly for a camera.

Conventional cameras typically include a body that houses photographic lenses, shutter mechanisms, battery powered flash mechanisms, and removable film packages, typically sold separately in rolls or cassettes. When a film package has been completely used, it is removed from the body for photographic processing, and a fresh film package is inserted into the body so that more pictures may be taken. However, care must be taken when installing and removing film packages to avoid damaging exposure of the film to light, and in some types of cameras, such as 35-mm cameras, film must be carefully loaded and threaded into a film feeder mechanism integrated into the camera body. Efficient and proper loading of the film in a small space within the camera body without damaging the film therefore demands some skill and experience.

Further, a rewind mechanism is typically included in conventional cameras 35 mm cameras to reload film into the film package before it may be removed from the camera body. The rewind mechanism adds expense to the camera, and introduces reliability issues into production and operation of the camera.

Due to the intricacies of the feeder mechanisms and rewind mechanisms, 35-mm cameras are somewhat complicated, relatively expensive, and are often difficult for novices to use and enjoy.

BRIEF DESCRIPTION OF THE INVENTION

In one aspect, a film cassette assembly is provided that comprises a film clip, an outer film cover adapted to received the film clip, and an inner film cover received in the outer film cover and over at least a portion of said film clip.

In another aspect, a film cassette assembly is provided which comprises an outer film cover comprising opposite lateral sides, a film clip situated between said lateral sides, said film clip comprising a winding housing at one end thereof, a film cartridge coupled to said film clip and distanced from said winding housing, and an inner film cover disposed over said film clip between said film cartridge and said winding housing, said inner film cover removably attached to said outer film cover.

In another aspect, a camera is provided which comprises a camera body, a film housing within said body, and a detachable film clip situated within said film housing, said film clip comprising a winding housing coupled thereto, said winding housing at least partially containing a roll of unused film. A film cartridge is coupled to said film clip and receives used film as pictures are taken, an advancing element is coupled to said body for advancing used film into said film cartridge as pictures are taken, and first and second removable film covers enclose a portion of said film clip when said film clip is removed from said film housing.

In another aspect, a method is provided for installing film into a detachable film cassette assembly, the cassette assembly including a film clip adapted to receive a film cartridge, a winding housing attached to the film clip, and first and second film covers. The method comprises coupling the film cartridge to the film clip, inserting the film clip into the first film cover, inserting the second film cover over the film clip, and engaging the first and second film covers to at least partially enclose the film clip between the winding housing and the film cartridge.

In another aspect, a method of installing film into a detachable film cassette assembly for a camera is provided. The film cassette assembly includes a film clip configured for attachment to a film cartridge, a winding housing extending from the film clip, and at least one guide track extending to the winding housing. The method further utilizes first and second film covers configured for attachment to one another, and the method comprises attaching the film cartridge to the film clip, attaching the first and second film covers to one another over the film clip, and winding the film from the film cartridge between one of the film covers and the guide track from the film cartridge to the winding housing before the film is used.

In still another aspect, a method for loading film into a camera including a body and a film housing therein, a detachable film clip situated within said housing and including a winding housing at one end thereof and at least one guide track extending adjacent the winding housing, the winding housing including a spool therein. The method employs a first and second removable film covers, and the method comprises removing the film clip from the film housing, attaching a film cartridge to the film clip, engaging a first end of a film with the spool, attaching the first and second film covers to the film clip on opposite sides of the film clip between the film cartridge and the winding housing, extending film from the film cartridge across the guide track to the winding housing before the film is used, removing the first and second film covers from the film clip, and returning the film clip to the film housing.

In another aspect, a camera is provided that comprises a body, a detachable film clip within said body, and a film cover configured to attach to said film clip when loading film.

In another aspect, a method for installing film into a detachable film cassette assembly is provided. The cassette assembly includes a film clip adapted to receive a film cartridge, a winding housing attached to the film clip, and a film cover. The method comprises coupling the film cartridge to the film clip, feeding film from the film cartridge to the winding housing, and engaging the film cover to the film clip between the winding housing and the film cartridge to cover exposed film.

DETAILED DESCRIPTION OF THE INVENTION

Figure 1:
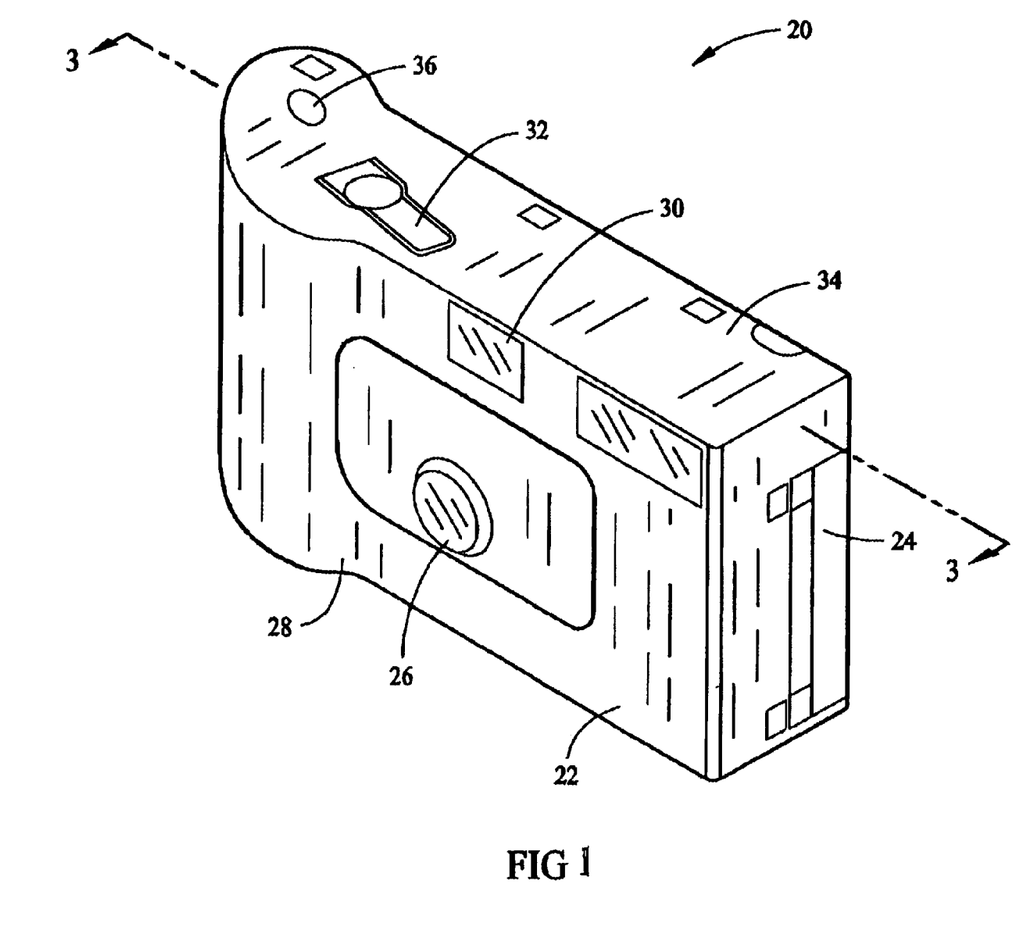
FIG. 1 is a front perspective view of an exemplary camera.

FIG. 1 is a front perspective view of an exemplary camera 20 that facilitates relatively simple and direct loading of film from standard packages, such as 35 mm film cartridges. Film may be loaded even in direct sunlight without requiring additional expense and complications of feeder mechanisms and rewind mechanisms for both manufactures and consumers. A lower cost, easy to use camera is therefore provided as explained in detail below.

As illustrated in an exemplary embodiment in FIG. 1, camera 20 includes a body 22, a rear door 24 attached to body 22, a dual lens element 26 extending through a front 28 of body 22, a view finder 30 extending through body front 28, a shutter-activating member 32 located on a top wall 34 of body 22, and a counter system 36 located on body top wall 34. Body 22 is fabricated from known opaque materials according to known methods and techniques to form a light resistant chamber (not shown in FIG. 1) that houses a film element (not shown in FIG. 1). Rear door 24 is hinged to body 22 for selective movement between an open position (not shown) and a closed position wherein rear door 24 is locked in place by a slide insert battery door (not shown in FIG. 1).

Figure 2:
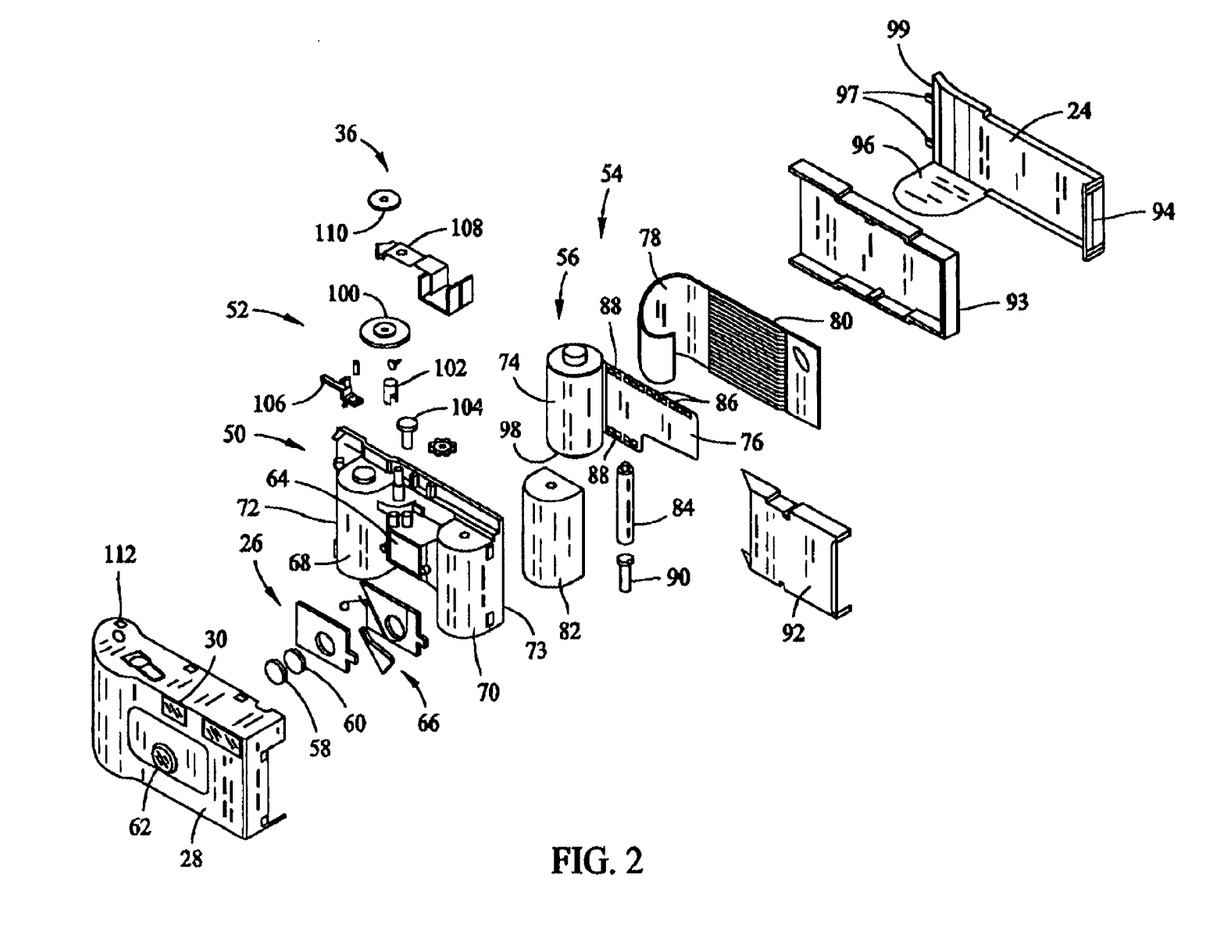
FIG. 2 is a front exploded perspective view of the camera shown in FIG. 1.

FIG. 2 is an exploded perspective view of camera 20 including dual lens element 26, a film element housing 50, frame counter system 36, a film-free self-activating shutter mechanism 52, and a detachable cassette assembly 54 for loading and unloading film element 56 without expensive and difficult to use winding mechanisms. Dual lens element 26 includes first and second lenses 58, 60 and extends through a central opening 62 of body front 28, and dual lens element 26 is substantially aligned with a central opening 64 of film element housing 50. Interposed between dual lens element 26 and film element housing 50 is a shutter 66 that is selectively positionable with film-free self activating shutter mechanism 52 to expose a frame (not shown in FIG. 2) of film element 56 to light and form a photograph image of an object or scene located with view finder 30.

Film element housing 50 includes a substantially cylindrical film element chamber 68 and a substantially cylindrical winding chamber 70 positioned substantially adjacent opposite sides 72, 73 of film element housing 50. In an exemplary embodiment, film element 56 is a known 35-mm film cartridge 74 fabricated from opaque materials and including a roll of filmstrip 76. Film element cartridge 74 is snap fit into a rounded film cartridge bracket or clip 78 of cassette assembly 54. Filmstrip 76 is advanced through flat guide tracks 80 of film clip 78 and into a winding housing 82 including a spool 84 for engaging feeder openings 86 located adjacent opposite filmstrip sides 88. Guide tracks 80 are flat by virtue of dual lens element 26 that reduces distortion and improves picture quality. A crank handle 90 is coupled to spool 84 and as crank handle 90 is rotated, spool 84 is also rotated.

Film cassette assembly 54 includes a removable inner film cover 92 dimensioned to overlie flat guide tracks 80 with snap-fit engagement to a removable outer film cover 93 to protect filmstrip 76 when cassette assembly 54 is detached from camera 20. As explained further below, film covers 92, 93 facilitate loading of film element 56 during daylight without damaging filmstrip 76. Camera rear door 24 is attached to body 22 on hinges 94 that allow rear door 24 to be opened for removal and installation of detachable film cassette assembly 54. Rear door 24 includes a rounded tab 96 that supports a bottom 98 of film element cartridge 74, and a pair of projections or tabs 97 on one edge 99 thereof that serve to securely close door 99.

Shutter mechanism 52 includes an advance wheel 100, a transmission gear 102, a sprocket gear 104, and a shutter kicker lever 106 to actuate shutter 66 as explained further below. Also, counter system 36 is positioned on a mounting bracket 108 for engagement with advance wheel 100. Counter system 36 includes a top surface 110 having indicia (not shown) to display a number of available frames, or alternatively a number of used frames, of film element 56 through an opening 112 in body top wall 34.

Figure 3:
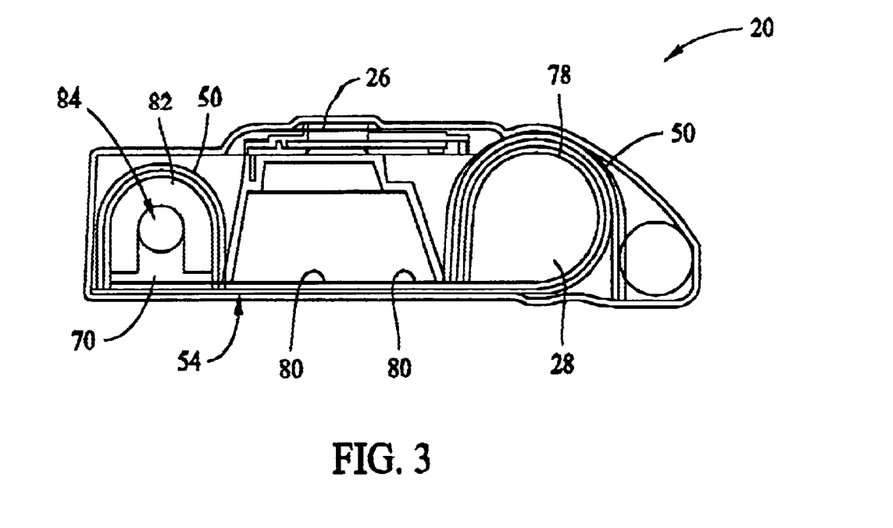
FIG. 3 is a cross sectional view of the camera shown in FIG. 1 taken along line 3—3.

FIG. 3 is a cross sectional view of camera 20 including dual lens element 26 situated between film element chamber 68 and winding chamber 70 of film element housing 50. Film clip 78 receives film element cartridge 74 (shown in FIG. 2) and filmstrip 76 (shown in FIG. 2) is advanced through flat guide tracks 80 and into winding chamber 70. Winding spool 84 engages filmstrip 76 for winding filmstrip 76 around spool 84 within winding housing 82, that is, in turn, located inside film element housing winding chamber 70. As explained further below, filmstrip 76 is manually pre-wound around spool 84 from film element cartridge 74, and advanced frame-by-frame back into film element cartridge 74 during use of camera 20 to facilitate rapid removal of film element cartridge 74 from film clip 78 without requiring a rewind mechanism familiar to known cameras.

Figure 4:
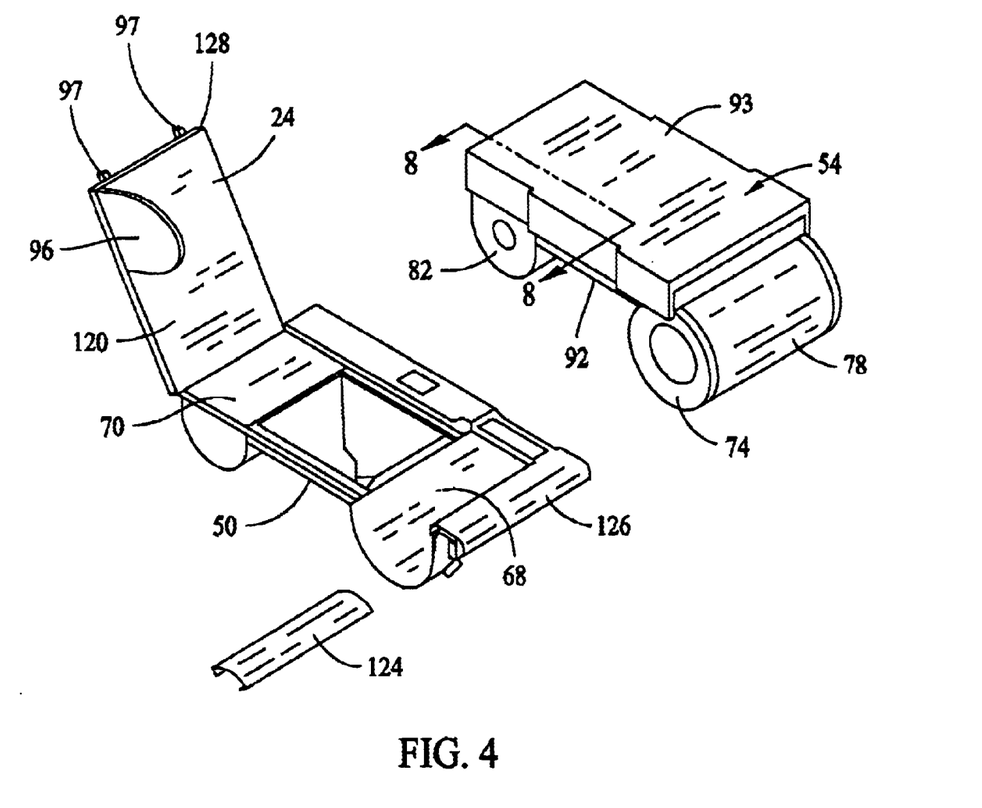
FIG. 4 is an exploded perspective rear view of an exemplary detachable film cassette assembly and housing.

FIG. 4 is an exploded perspective view of detachable cassette assembly 54 loaded with film element cartridge 74 received in film clip 78 and with inner and outer film covers 92, 93 engaged to one another and to film clip 78. As explained below, film covers 92, 93 protect filmstrip 76 (shown in FIG. 2) extending between film element cartridge 74 and winding housing 82 upon film clip guide tracks 80 (shown in FIG. 2) as film is loaded into cassette assembly. When camera rear door 24 is opened, film clip 78 is easily lifted from and returned to film element housing 50 for replacement of film cartridge 74, and film covers 92, 93 are easily attached and removed from film clip 78.

When film covers 92, 93 are removed, film clip 78 and attached winding housing 82 are placed into film element housing film element chamber 68 and winding chamber 70, respectively, and camera rear door 24 closes over film clip 78 so that an inner surface 120 of rear door 24 is substantially adjacent and overlying an outer surface of film clip 78. Rear door rounded tab 96 extends substantially perpendicularly from rear door inner surface 120 and retains film element cartridge 74 within film element chamber 68. Once rear door 24 is in a closed position, a battery cover 124 slides over a ledge 126 adjacent an edge 128 of rear door 24 to prevent rear door 24 from opening and maintaining rear door 24 in a closed position. Door tabs 97 extend beneath battery cover 124 so that door 24 is securely interlocked with battery cover 124. Once battery cover 124 is removed, rear door 24 is easily opened and film clip 78 may be removed. Also, battery cover 124 protects a known battery source (not shown) for use in known battery powered systems (not shown) such as, for example, a flash bulb system.

Alternatively, instead of removing battery cover 124 to open camera rear door 24, battery cover 124 is maintained in position relative to camera rear door 24 with a holding device (e.g., a label). In this embodiment, rear door 24 is opened by applying pressure to battery cover 145 in a direction toward a bottom of camera 20, thereby slightly flexing camera body 22 (shown in FIG. 1) and displacing battery cover 124 to release rear door tabs 97 from underneath battery cover 124. Once tabs 97 are released, rear door 24 may be opened. Rear door 24 may be closed by rotating rear door 24 until tabs 97 engage a top surface of battery cover 124 and applying pressure to rear door 24 so that tabs 97 flex camera body 20 and snap into place beneath battery cover 124.

Figure 5:
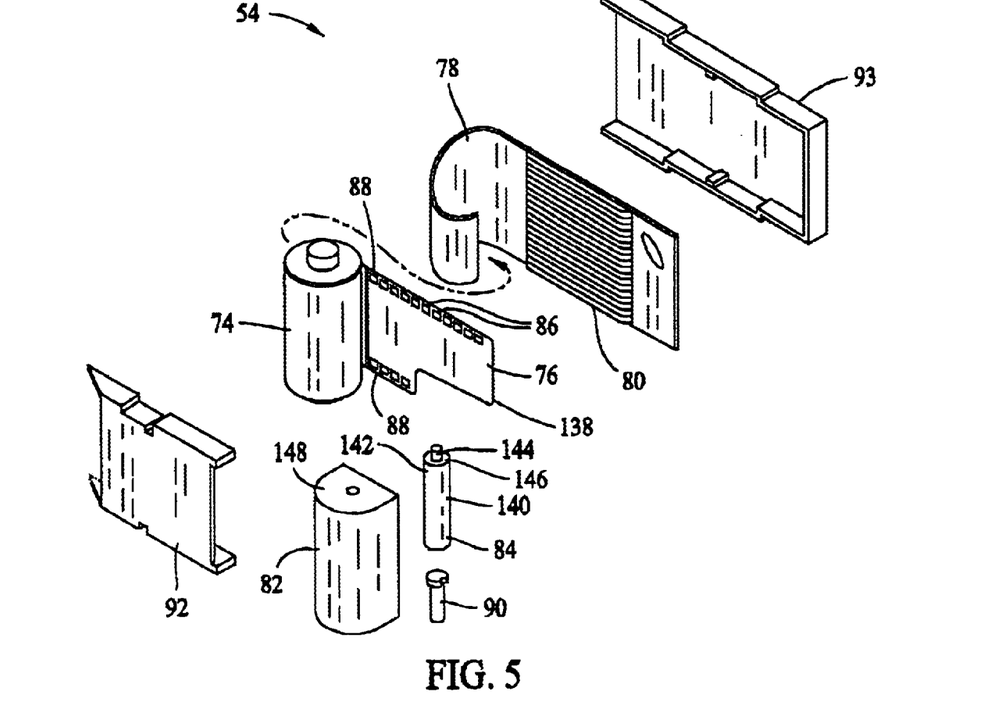
FIG. 5 is a exploded perspective front view of the exemplary detachable film cassette assembly shown in FIG. 4.

FIG. 5 is an exploded perspective view of detachable film cassette assembly 54 illustrating installation of filmstrip 76. In one embodiment, a known 35-mm film cartridge 74 is snap-fit into cartridge rounded bracket 78. An end 138 of filmstrip 76 extends over guide tracks 80 into winding housing 82 and is coupled to winding spool 84 therein. A pin 144 projects from a top surface 146 of spool 84 and extends into a top 148 of winding housing 82 to maintain spool 84 in position relative to winding housing 82. A knob 140 projects radially from an outer surface 142 of spool 84 for engagement with one of a plurality of feeder openings 86 through filmstrip 76 adjacent opposite filmstrip sides 88.

Once film cartridge is fitted into film clip 78, filmstrip end 138 is fed over guide tracks and into winding housing 82 until filmstrip 76 contacts spool 84. Spool 84 is manually turned with crank handle 90 to engage a filmstrip opening 86 with spool knob 140. After end 136 of filmstrip 76 is engaged by knob 140, inner film cover 92 is snap-fit over guide tracks 80 of film clip 78 into engagement with outer film cover 93 to form a double-sided protective light barrier enclosure about guide tracks 80. By rotating crank handle 90, film may be loaded into winding housing 82 about spool 84.

While in the illustrated embodiment inner and outer film covers 92, 93 are employed on both sides of film clip 78 in the vicinity of guide tracks 80, it is contemplated that at least some of the benefits of the instant invention may be obtained by using inner film cover 92 to protect film on only one side of film clip 78, i.e., without using outer film cover 93.

Film may be loaded into film cassette assembly 54 apart from camera body 22 (shown in FIG. 1) when film clip 78 is removed from camera 20 (shown in FIGS. 1–3). Thus, film need not be loaded in a cramped space within the camera body into an intricate feeder mechanism as conventional cameras typically require.

Figure 6:
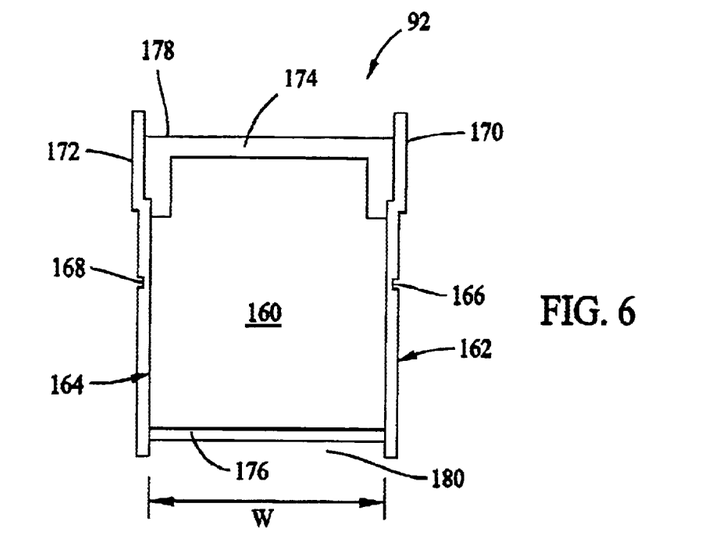
FIG. 6 is a bottom plan view of an inner portion of the film cassette assembly shown in FIG. 4.

FIG. 6 is a bottom plan view of inner film cover 92 that, together with outer film cover 93 (shown in FIGS. 2, 4 and 5) in an exemplary embodiment protects filmstrip 76 (shown in FIGS. 2 and 5) from damaging light exposure while loading film into film cassette assembly 54 (shown in FIGS. 2 and 5). In an illustrative embodiment, inner cover 92 includes a substantially flat and rectangular plate 160 and two side rails 162, 164 extending on opposite lateral sides of plate 160. Side rails 162, 164 extend substantially perpendicular to a surface of plate 160, and each side rail 162, 164 includes a respective slot 166, 168 and a respective flare 170, 172 that, as explained below, engage complementary portions of cassette assembly outer film cover 93.

Side rail flares 170, 172 of inner film cover 92 are outwardly displaced from a remainder of respective side rails 162, 164 such that inner film cover 92 has a slightly greater width W at the location of side rail flares 170, 172 than elsewhere along inner film cover 92. In an exemplary embodiment, plate 160 and side rails 162, 164 are integrally formed from thermoplastic materials according to known methods and techniques, including but not limited to injection molding processes.

Barrier strips 174, 176 fabricated from an opaque material are applied to the surface of plate 160 at respective front and rear edges of plate 160. As such, barrier strips 174, 176 extend substantially perpendicular to and between inner door side rails 162, 164 to form light barriers on the leading edges of plate 160 between side rails 160, 162. In an exemplary embodiment, barrier strips 174, 176 are fabricated from a lightweight, resilient, compressible foam material, although it is appreciated that a variety of materials known in the art may be suitable for preventing light transmission between open ends of inner door side rails 162, 164.

Side rails 162, 164 and barrier strips 174, 176 together define a four sided, light-blocking filmstrip enclosure therebetween for filmstrip 76 when film clip 78 is removed from camera 20 (shown in FIGS. 1–3). Also, as illustrated in FIG. 6, each end of inner film cover side rails 162, 164 extends beyond the leading edges of plate 160, thereby forming external slots 178, 180 between side rails 160, 162 adjacent each leading edge of plate 160. As will become evident below, slots 178, 180 accommodate film cartridge 74 (shown in FIG. 5) and winding housing 82 (shown in FIG. 5), respectively, when inner film cover 92 is attached to film clip 78 via outer film cover 93. Barrier strips 174, 176 extend adjacent each of respective slots 178, 180 and are slightly recessed relative to the ends of inner door side rails 162, 164.

Figure 7:
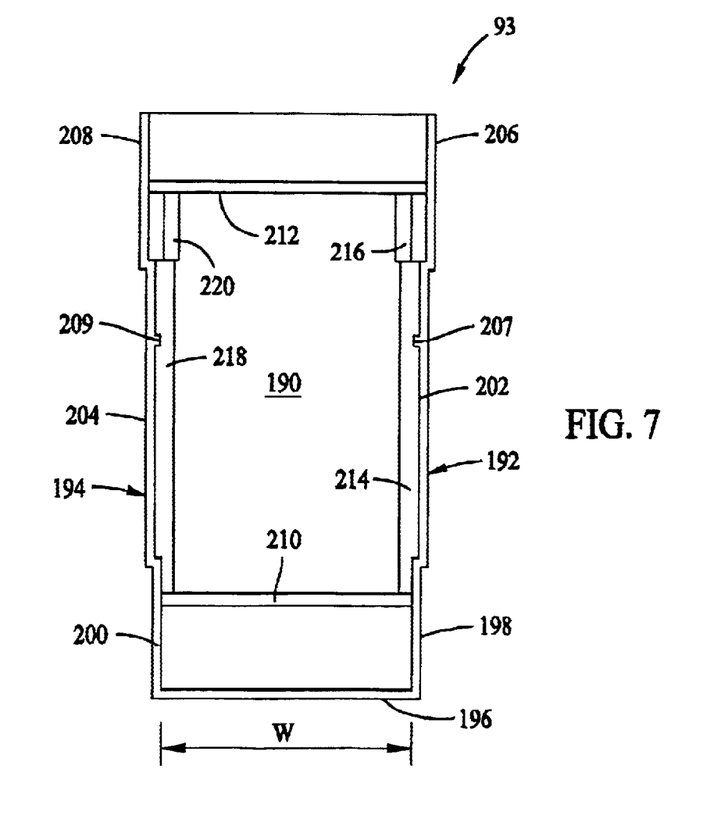
FIG. 7 is a bottom plan view of an outer portion of the film cassette assembly shown in FIG. 4.

FIG. 7 is a bottom plan view of outer film cover 93 that, together with inner film cover 92 (shown in FIG. 6) protects filmstrip 76 (shown in FIGS. 2 and 5) from damaging light exposure while loading film into film cassette assembly 54 (shown in FIGS. 2 and 5).

Outer film cover 93, in an exemplary embodiment, includes a substantially flat plate 190 from which opposite lateral sides 192, 194 depend. Lateral sides 192, 194 extend upwardly from and substantially perpendicular to flat plate 190, and an end section 196 connects one end of each of lateral sides 192, 194 and end section 196 is substantially perpendicular to both lateral sides 192, 194 and to a surface of plate 190. Plate 190, lateral sides 192, 194, and end section 196 are integrally formed and fabricated from thermoplastic materials according to known methods and techniques in one embodiment, such as by an injection molding process, although it is recognized that other materials and techniques may likewise be employed in alternative embodiments without departing from the scope of the present invention.

Each lateral side 192, 194 of outer film cover 93 has three distinct portions in an illustrative embodiment that mate with other portions of film cassette assembly 54 as explained further below. A first portion 198, 200 of each of outer film cover sides 192, 194 adjacent end section 196 extends for a width W. A second portion 202, 204 of each respective lateral side 192, 194 extends from each of first portions 198, 200 and has a width slightly larger than width W between side first portions 198, 200. A third portion 206, 208 extends from each of second portions 202, 204 and has a width slightly larger than the width between side second portions 202, 204. In other words, each of lateral sides has an outwardly stepped configuration extending from end section 196. Additionally, lateral side second portions 204, 206 each include an inwardly projecting rib 207, 209, respectively that cooperate with inner film cover slots 166, 168 (shown in FIG. 6) to securely engage film inner cover 92 with outer film cover 93.

Barrier strips 210, 212 are fabricated from an opaque material and applied to a surface of plate 190 at substantially right angles to lateral side third portions 206, 208 and lateral side first portions 198, 200. Barrier strips 214, 216, 218, and 220 are extended between barrier strips 210, 212 and substantially coincide with inner walls of later sides 192, 194. As such, a four sided enclosure is defined by light barriers 210–220 to serve as a light-blocking filmstrip enclosure extending oppositely inner film cover 92 when inner film cover 92 (described in FIG. 6) and outer film cover 93 are attached to film clip 78 to cover the light sensitive film extending between film cartridge 74 and winding housing 82 as film is loaded.

In an exemplary embodiment, barrier strips 210–220 are fabricated from a lightweight, resilient, compressible foam material, although it is appreciated that a variety of materials known in the art may be suitable for preventing light transmission to the area of filmstrip 76 as film is being loaded.

Figure 8:
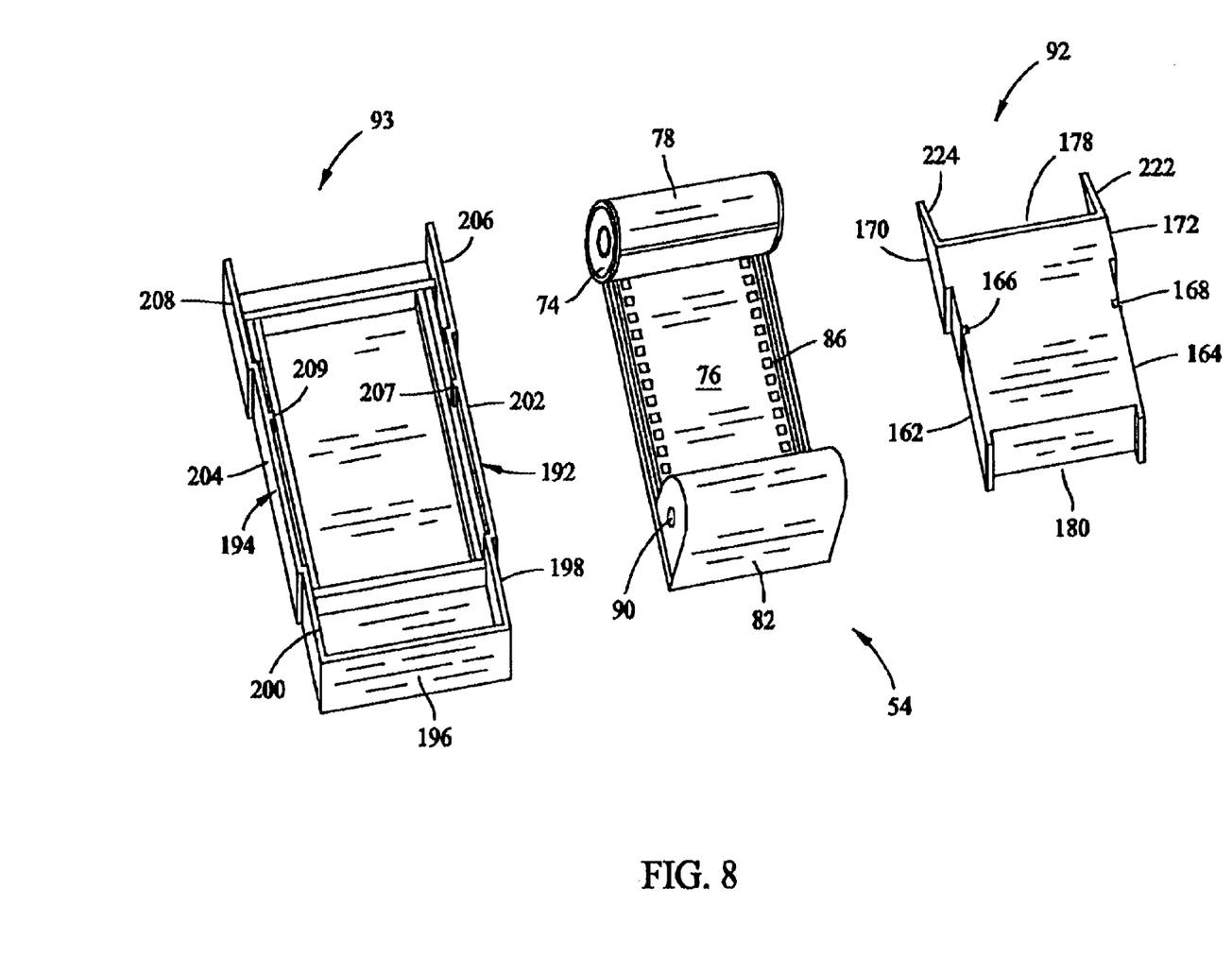
FIG. 8 is an exploded perspective view of the film cassette assembly shown in FIG. 4.
Figure 9:
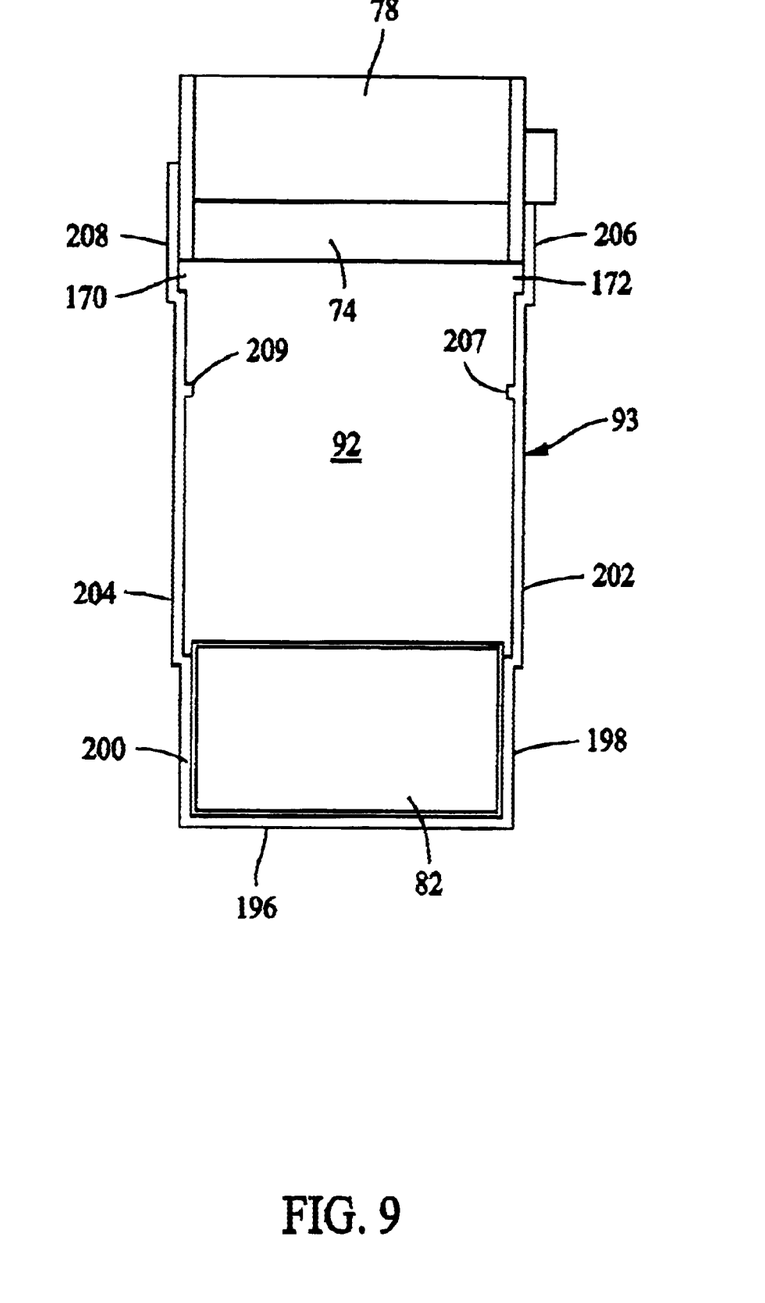
FIG. 9 is a top plan view of the assembled film cassette assembly shown in FIG. 8.

FIG. 8 is an exploded perspective view of film cassette assembly 54 with film installed and FIG. 9 is a top plan view of film cassette assembly as assembled. Film cartridge 74 is received by film clip 78 and filmstrip 76 is advanced therefrom into winding housing 82 extending from an opposite end of film clip 78 than film cartridge 74. Film clip 78 is situated within outer film cover 93 such that winding housing 82 is substantially received between outer film cover side first portions 198, 200 and outer film cover end section 196, while film cartridge 74 is extended through and beyond outer film cover third portions 206, 208.

Once film clip 78 is situated as described within outer film cover 93, inner film cover 92 is inserted over film clip 78 such that external slot 176, 180 of inner film cover 92 receives winding housing 82, and external slot 178 of inner film cover 92 receives film cartridge 74 with beveled edges 222, 224 of inner film cover flares extending beneath film cartridge 74. Lateral side rail flares 170, 172 of inner film cover 92 are received between outer film cover side third portions 206, 208, and a remainder of lateral side rails 162, 164 of film inner cover 92 are situated between outer film cover side second portions 202, 204. For a secure connection between film covers 92, 93, outer film cover ribs 207, 209 are received within inner film cover slots 166, 168 formed in side rails 162, 164.

In an exemplary method of assembling film cassette assembly 54 and installing film, winding housing 82 is pre-fabricated and attached to film clip 78 including spool 84 (shown in FIG. 5) and crank handle 90 (also shown in FIG. 5) therein. Film cartridge 74 is inserted into the rounded bracket end of film clip 78 opposite winding housing 82. Filmstrip end 136 (shown in FIG. 5) is advanced from film cartridge 74 to winding housing 82 and into engagement with winding spool 84 connected to crank handle 90. By rotating crank handle, spool knob 140 (shown in FIG. 5) is engaged to a filmstrip feeder opening 86 (shown in FIG. 5), and spool 140 is coupled to filmstrip 76.

Once filmstrip is coupled to spool 140, film clip 78 is situated within outer film cover 93 such that winding housing 82 is substantially flush with outer film cover end section 196 and lateral edges of film clip 78 are located between lateral sides 192, 194 of outer film cover 93. First portions 198, 200 of outer film cover lateral sides 192, 194 snugly contain winding housing 82 and center film clip 78 with respect to lateral side second portions 204, 204, and third portions 206, 208 of outer film cover 93. Outer cover side second and third portions 202–208 are dimensioned to create a gap between lateral edges of film clip 78 and the respective second and third portions 202–208 of outer film cover lateral sides 192, 194. Side rails 162, 164 of inner film cover 92 (shown in FIG. 6) are received in this gap.

Once film clip 78 is properly positioned with respect to outer film cover 93, beveled leading edges 222, 224 of inner film cover side rail flares 170, 172 are then inserted beneath film cartridge 74 such that inner film cover flares 170, 172 are located between outer film cover side third portions 206, 208 and the lateral edges of film clip 78, and also so that film cartridge 74 is received in inner film cover slot 178. Then, by rotating inner film cover 92 about edges 222, 224 of inner film cover flares 170, 172, the opposite end of inner film cover 92 is brought into contact with winding housing 82. When winding housing 82 is received in inner film cover slot 180, inner film cover 92 may be snapped into place by pressing down on inner film cover 92. Outer film cover ribs 207, 209 are received in inner film cover slots 166, 168 with a slight interference fit to securely hold film cassette assembly 54 together.

It is contemplated that in an alternative embodiment inner film cover 92 may be engaged to film clip 78, and then film clip 78 and attached inner film cover 92 may be inserted into outer film cover 93 to complete assembly 54. The invention is not intended to be limited to a specific permutation of the order of assembly of components of film cassette assembly 54.

It is further contemplated, as noted above, that inner film cover 92 may be used without outer film cover 93 in an alternative embodiment while achieving at least some of the benefits of the present invention. Inner film cover 92 as described above will securely engage to film clip 78 in the absence of outer film cover and inner film cover barrier strips 174, 176 (shown in FIG. 6) extend from inner film cover 92 adjacent film cartridge 74 and winding housing 82, respectively to protect filmstrip even without outer film cover 93.

When cassette assembly 54 is assembled and both covers 92, 93 are used, barrier strips 174, 176 (shown in FIG. 6) extend from inner film cover 92 adjacent film cartridge 74 and winding housing 82, respectively, on one side of filmstrip 76, and barrier strips 210–220 (shown in FIG. 7) extend on the other side of filmstrip 76 and film clip 78. When inner film cover side rails 162, 164 are received within outer film cover lateral sides 192, 194, an effective enclosure is therefore created about exposed filmstrip 76 between film cartridge 74 and winding housing 82. Thus, film cassette assembly 54 may loaded with film as described above, even in broad daylight, without exposing the film to damaging light.

Figure 10:
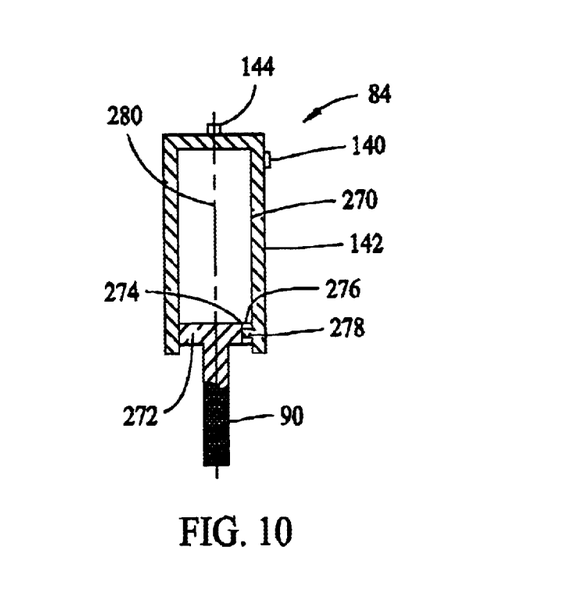
FIG. 10 is a cross sectional view of an exemplary winding spool in an extended position for the detachable film cassette assembly shown in FIG. 5.

FIG. 10 is a cross sectional view of winding spool 84 including a substantially cylindrical body 270, and crank handle 90 including a head 272 dimensioned for sliding engagement therein for reciprocal movement of crank handle 90 relative to spool body 270. A keyway 274 on an outer circumference 276 of crank handle head 272 receives a radially inward projecting ledge 278 of spool body 270. Keyway 274 and ledge 278 couple spool body 270 and crank handle 90 together so that as crank handle 90 is rotated about a longitudinal axis 280, spool body 270 also rotates as spool body 270 is maintained in position relative to winding housing 82 (shown in FIG. 5) by pin 144. Knob 140 projects from outer surface 142 of spool body 270 so as to engage filmstrip feeder openings 86 (shown in FIG. 5) to wrap filmstrip 76 around spool body 270 as crank handle 90 is turned about longitudinal axis 280.

Figure 11:
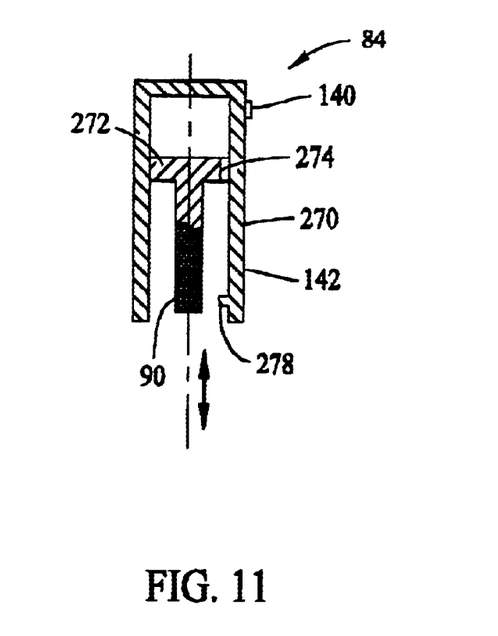
FIG. 11 is a view similar to FIG. 10 but illustrating the winding spool in a retracted position.

FIG. 11 illustrates crank handle 90 in a retracted position wherein crank handle head 272 is positioned relative to spool body 270 so that substantially an entirety of crank handle 90 is located within spool body 270. In one embodiment, crank handle 90 is selectively moved between an extended position (shown in FIG. 10) and a retracted position (shown in FIG. 11) with gravity assistance by holding detachable cassette assembly 54 vertically so that gravitational forces either extend or retract crank handle 90 within spool body 270. In alternative embodiments, other coupling features (not shown), including but not limited to, threads or pins, are use in lieu of spool body projecting ledge 278 and crank handle keyway 274 to couple crank handle 90 to spool body 270 for rotational motion to wrap or wind filmstrip (shown in FIG. 5) around spool 84.

Figure 12:
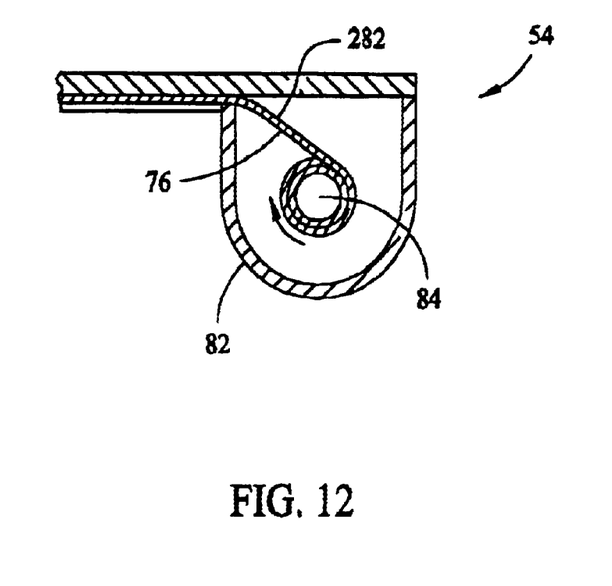
FIG. 12 is a cross sectional view of a portion of the film cassette assembly shown in FIG. 4 taken along line 8—8.

FIG. 12 is a cross sectional view of detachable cassette assembly 54 through winding housing 82 and illustrating a spring strip element 282 to direct filmstrip 76 to spool 84 and facilitate engagement of filmstrip 76 with spool knob 140, as well as to ensure that filmstrip 76 is tightly wound around spool 84 as spool crank handle 90 is rotated. Substantially all of filmstrip 76 is manually wound around spool body 270, and filmstrip 76 is then advanced frame-by-frame into film element cartridge 74 as explained below.

Figure 13:
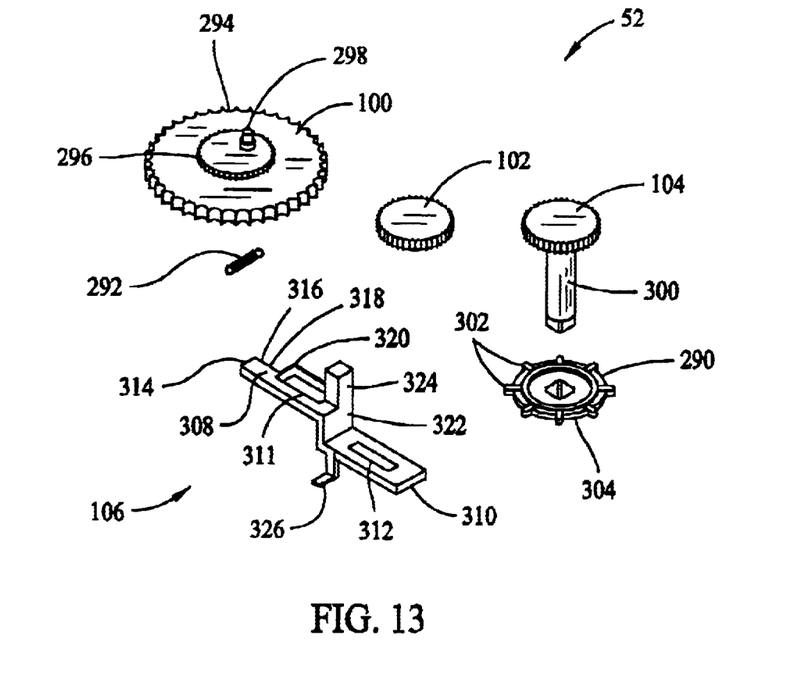
FIG. 13 is a schematic perspective view of an exemplary shutter mechanism shown in FIG. 2.

FIG. 13 is a schematic perspective view of film-free self-activating shutter mechanism 52 including advance wheel 100, transmission gear 102, a sprocket gear 104, a sprocket wheel 290, shutter kicking lever 106, and a spring element 292. Advance wheel 100 includes an outer surface 294 for rotational engagement by a user, and a concentric inner surface 296 for driving engagement with transmission gear 102. Inner surface 296 includes an actuating pin 298 for engagement with shutter kicking lever 106 as described further below. Transmission gear 102 is driven by advance wheel 100. Sprocket gear 104 is driven by transmission gear 102, and sprocket wheel 290 is coupled to a shaft 300 extending below transmission gear 102. Sprocket wheel 290 includes a plurality of spokes 302 (eight in the illustrated embodiment) projecting radially outward from an outer perimeter 304 of sprocket wheel 290. Spokes 302 engage filmstrip feeder openings 86 (shown in FIG. 5) so that rotation of sprocket wheel 290 advances filmstrip 76 from winding housing 82 (shown in FIG. 5) to film element cartridge 74 (shown in FIG. 5). Filmstrip 76 (shown in FIG. 5) is advanced for a predetermined number of feeder openings 86 as each photograph is taken.

Shutter-kicking lever 106 includes first and second pillar supports 308, 310 including respective first and second elongated openings 311, 312 therethrough. First pillar support 308 includes a flat end 314, a rounded corner 316 extending between flat end 314 and a flat follower portion 318 extending substantially perpendicular to flat end 314. Follower portion 318 includes a riser segment 320, i.e., an upwardly curved segment, adjacent first opening 308. Second pillar support 310 is substantially rectangular, extends parallel to first pillar segment 308, and is connected to first pillar segment 306 with a connecting wall 322 extending substantially perpendicular to both first and second pillar supports 308, 310. An actuator projection 324 extends from connecting wall 322 above first pillar support 308, and a kicker arm 326 extends below second pillar support 310 to actuate shutter 66 (shown in FIG. 2) against the action of spring element 292 as advance wheel 100 is rotated.

Figure 14:
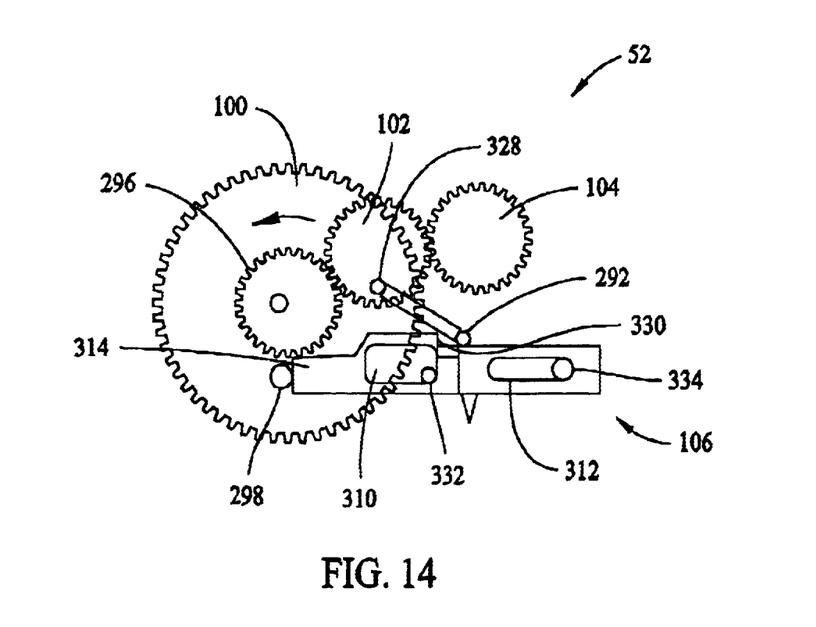
FIG. 14 is a plan view of the shutter mechanism shown in FIG. 13 in an initial position.
Figure 15:
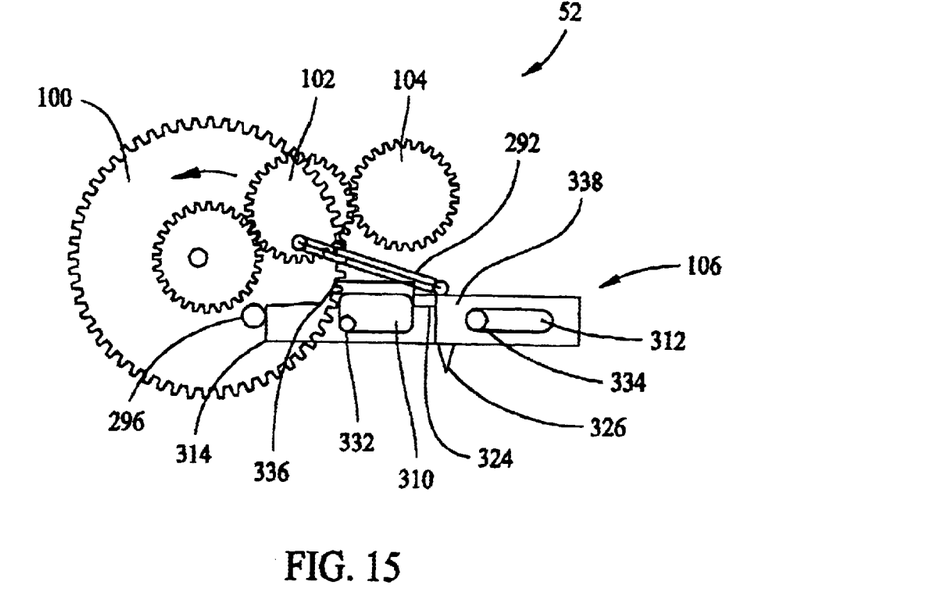
FIG. 15 is a view similar to FIG. 14 illustrating the shutter mechanism in an activation position.

FIGS. 14 and 15 are plan views of film-free self-activating shutter mechanism 52 in use. Advance wheel inner surface 296 is drivingly coupled to transmission gear 102, and transmission gear 102 is drivingly coupled to sprocket gear 104. Spring element 292 is coupled to transmission gear 102 on a first end 328, and to shutter kicking lever 106 on a second end 330. Shutter kicking lever 106 is supported on first and second pillars 332, 334 extending through pillar support first and second openings 310, 312, respectively.

As illustrated in FIG. 14, as film advance wheel 100 rotates, advance wheel actuating pin 298 rotates into engagement with flat end 314 of shutter-kicking lever 106 in an initial position. As film advance wheel 100 is further rotated, film advance wheel actuating pin 298 moves shutter-kicking lever 106 to an activation position shown in FIG. 15. In the activation position, further lateral movement of shutter kicker 106 is prevented by pillars 332, 334 positioned against respective ends 336, 338 of first and second pillar support openings 311, 312, and spring element 292 is in a fully extended position.

When shutter-activating member 32 (shown in FIG. 1) is depressed, shutter activating member 32 contacts shutter-kicking lever actuator projection 324 and moves shutter kicker lever 106 to disengage advance wheel actuating pin 298 from shutter kicker lever flat end 314 and releases shutter kicker lever 106 from the activation position. Once shutter-kicking lever 106 is released from the activation position, spring element 292 recoils and causes shutter kicking lever 106 to pivot about pillars 332, 334 and return to the initial position illustrated in FIG. 14. As shutter kicker lever 106 returns to the initial position, kicker arm 326 actuates shutter 66 (shown in FIG. 2), thereby exposing a frame of filmstrip 76 to light and forming a photographic image. As film advance wheel 100 is rotated back to the activation position, sprocket wheel 290 (shown in FIG. 13) advances filmstrip 76 (shown in FIG. 5) by one frame. Therefore, a fresh frame of filmstrip 76 is in position and photographic film package 20 (shown in FIG. 1) is ready for taking another photograph when shutter-activating member 32 is depressed.

Figure 16:
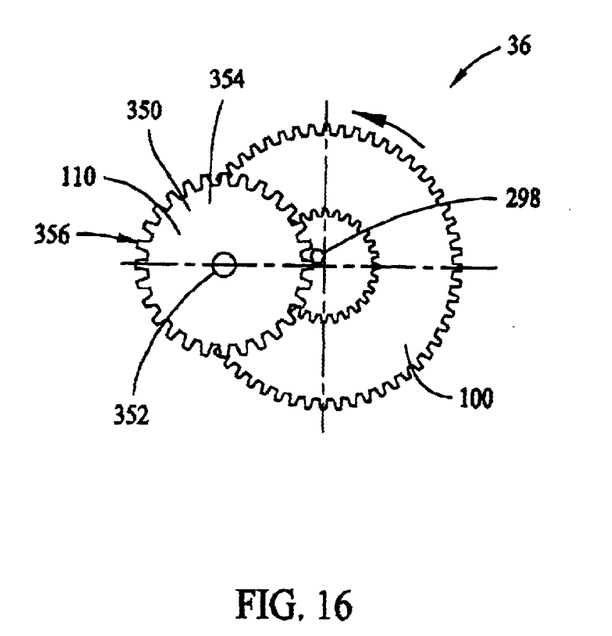
FIG. 16 is a plan view of an exemplary frame counter system.

FIG. 16 is a top plan view of frame counter system 36 including a counter wheel 350 supported on a pillar 352 of a mounting bracket 108 (shown in FIG. 2) located partially over film advance wheel 100. When film advance wheel 100 is rotated, advance wheel actuating pin 298 engages one of teeth 354 on an outer surface 356 of counter wheel 350. As film advance wheel 100 is rotated further, advance wheel actuating pin 298 disengages with counter wheel teeth 354 and counter wheel 350 ceases to rotate. Counter wheel 350 indicates available frames remaining or used frames for camera 20 (shown in FIG. 1) with appropriately placed indicia (not shown) on top surface 110 of counter wheel 350.

The above-described camera 20 may be used according to the following method once camera 20 is assembled. In a particular embodiment, film clip winding housing 82 (shown in FIGS. 4 and 5) is pre-loaded with film from a conventional 35-mm film cartridge 74 (shown in FIGS. 4 and 5)

received in film clip 78. Filmstrip 76 (shown in FIG. 5) is pre-wound into winding housing 82 (shown in FIG. 5) using spool 84 and crank handle 90 therein as filmstrip 76 is fed through guide tracks 80 into winding housing 82 until a last filmstrip frame is positioned within adapter guide tracks 80. Film clip 78 is installed into film element housing 50 and camera rear door 24 is closed over film clip 78. Camera 20 is then ready for use.

A user takes photographs by locating a desired object or scene with viewfinder 30 (shown in FIG. 1) and depressing shutter activating member 32 when shutter mechanism 52 is in the activation position (shown in FIG. 15) to actuate shutter mechanism 52 to take a photograph. By rotating film advance wheel 100 until shutter mechanism 52 is returned to the activation position (shown in FIG. 14), another filmstrip frame is positioned behind shutter 66 (shown in FIG. 2) and another photograph may be taken. The above process is repeated until all filmstrip frames have been used and substantially all of filmstrip 76 is returned to standard film cartridge 74.

Camera rear door 24 may be opened by removing battery cover 124 (shown in FIG. 4) or by applying pressure to battery cover 124 in a direction toward a bottom of camera 20 to release door tabs 97 (shown in FIGS. 2 and 4), and rear door 24 may be rotated about hinges 94 (shown in FIG. 2) once opened. Film clip 78 may then be removed from film element housing 50 and film cartridge 74 removed from film clip 78 for processing. A new film cartridge 74 may then be snapped into adapter rounded bracket 78, and film cartridge 74 (shown in FIG. 5) may be rotated to feed filmstrip 76 (shown in FIG. 5) across guide tracks 80 and into engagement with spool 84 inside winding housing 82 (shown in FIG. 5). Crank handle 90 (shown in FIG. 5) may be rotated to engage spool knob 140 to filmstrip feeder openings 86.

After snapping film covers 92, 93 (shown in FIGS. 5–9) over film clip guide tracks 80 to protect the film, crank handle 90, may be rotated to fully wind filmstrip 76 within winding housing 82 (shown in FIG. 5) to prepare camera for use. Once film is fully advanced to winding housing 82, film covers 92, 93 are then removed and detachable film clip 78 is reinstalled into film element housing 50. By closing rear door 24, either by reinstalling battery cover 124 or snapping rear door tabs 97 over battery cover 124, camera 20 is again ready for reuse.

Therefore, an easy to use camera 20 is provided that facilitates risk free loading and unloading of film apart from the camera body, thereby avoiding cramped spaces in within the camera body for loading of film. Film may be loaded into the above-described cassette assembly even in daylight hours, while avoiding costly rewinding mechanisms and film feeder mechanisms that add expense to the camera and that can be difficult to use Thus, the above-described camera 20 is less expensive and simpler to use than many known 35 mm cameras, and further avoids reliability issues poised by feeder and rewinding mechanisms.

While the invention has been described in terms of various specific embodiments, those skilled in the art will recognize that the invention can be practiced with modification within the spirit and scope of the claims.

What is claimed is:

1. A film cassette assembly comprising:
    a film clip comprising a winding housing and configured to receive a film cartridge distanced from said winding housing;
    an outer film cover adapted to receive said film clip; and
    an inner film cover received in said outer film cover and over at least a portion of said film clip such that film extending between the film cartridge and said winding housing is covered between the film cartridge and said winding housing.

2. A film cassette assembly in accordance with claim 1 wherein said film clip is configured to receive a 35 mm film cartridge.

3. A film cassette assembly in accordance with claim 1, said film clip comprising at least one film guide, said inner film cover situated over said film guide.

4. A film cassette assembly in accordance with claim 1, at least one of said outer film cover and said inner film cover having a stepped configuration.

5. A film cassette assembly comprising:
    an outer film cover comprising opposite lateral sides;
    a film clip situated between said lateral sides, said film clip comprising a winding housing at one end thereof;
    a film cartridge coupled to said film clip and distanced from said winding housing; and
    an inner film cover disposed over said film clip between said film cartridge and said winding housing such that film extending between said film cartridge and said winding housing is covered between said film cartridge and said winding housing, said inner film covet removably attached to said outer film cover.

6. A film cassette assembly in accordance with claim 5 wherein at least one of said lateral sides has a stepped configuration.

7. A film cassette assembly in accordance with claim 5 wherein said inner film cover comprises at least one flare received in said outer film cover.

8. A film cassette assembly in accordance with claim 7 wherein said inner turn cover flare comprises a beveled edge, said edge extending beneath said film cartridge.

9. A film cassette assembly in accordance with claim 5 wherein one of said inner and said outer film covers comprises a rib, and the other of said inner film cover and said outer film cover comprises a slot, said rib received in said slot.

10. A camera comprising;
    a camera body;
    a film housing within said body;
    a detachable film clip situated within said film housing, said film clip Comprising a winding housing coupled thereto, said winding housing at least partially contained a roll of unused film;
    a film cartridge coupled to said film clip and receiving used film as pictures are taken;
    an advancing element coupled to said body for advancing used film into said film curt ridge as pictures are taken; and
    first and second removable film covers enclosing a portion of said film clip when said film clip is removed from said film housing.

11. A camera in accordance with claim 10 wherein at least one of said first and second film covers has a stepped configuration.

12. A camera in accordance with claim 10 wherein at least one of said first and second film covers comprises a light barrier.

13. A camera in accordance with claim 10 wherein said film cartridge is a 35 mm film cartridge.

14. A camera in accordance with claim 10, said film clip further comprising a film guide track, said first and second film covers enclosing said guide track.

15. A method for installing film into a detachable film cassette assembly, that cassette assembly including a film clip adapted to receive a film cartridge, a winding housing attached to the film clip, and first and second film covers, said method comprising:

coupling the film cartridge to the film clip;

inserting the film clip into the first film cover;

inserting the second film cover over the film clip; and engaging the first and second film covers to at least partially enclose the film clip between the winding housing and the film cartridge.

16. A method in accordance with claim 15 wherein further comprising advancing film from the film cartridge to the winding housing to prepare the film for taking pictures.

17. A method in accordance with claim 15, each of the first and second film covers having lateral sides, one of the lateral sides of the first film cover including a rib and one of the lateral sides of the second film cover including a slot, said engaging the first and second film covers comprising;

positioning the second cover slot over the slot; and engaging the slot and the rib.

18. A method of installing film into a detachable film cassette assembly for a camera, the film cassette assembly including a film clip configured for attachment in a film cartridge, a winding housing extending from the film clip, and at least one guide track extending to the winding housing, the method further utilizing first and second film covers con figured for attachment to one another, said method comprising:

attaching the film cartridge to the film clip;

attaching the first and second film covers to one another over the film clip; and     winding the film from the film cartridge between one of the film covers and the guide track from the film cartridge to the winding housing before the film is used.

19. A method in accordance with claim 18 wherein said attaching the first and second film covers to one another over the film clip comprises:

inserting the film clip into the first cover such that the film clip is situated between lateral side walls of the first film cover; and     inserting the second film cover over the film clip such that lateral side walls or the second cover are engaged to the lateral side walls of the first film cover.

20. A method in accordance with claim 18, the second cover including flares with beveled edges, said inserting the second film cover over the film clip comprising;

inserting the beveled edges of the flares under the film cartridge;

rotating the second cover about the beveled edges until the second cover contacts the winding housing; and     pressing the second cover until the second cover snaps over the film clip.

21. A method for loading film into a camera including a body and a film housing therein, a detachable film clip situated within said housing and including a winding housing at one end thereon and at least one guide track extending adjacent the winding housing, the winding housing including a spool therein, the method further employing first and second removable film covers, said method comprising:

removing the film clip from the film housing;

attaching a film cartridge to the film clip;

engaging a first end of a film with the spool;

attaching the first and second film covers to the film clip on opposite sides of the film clip between the film cartridge and the winding housing;

extending film from the film cartridge across the guide track to the winding housing before the film is used;

removing the first and second film covers form the film clip; and     returning the film clip to the film housing.

22. A method in accordance with claim 21 wherein the winding housing includes a spool and a crank handle, said extending film from the film cartridge across the guide track to the winding housing comprising:

rotating the film cartridge until the film is advanced to the spool; and     rotating the crank handle to wind the film around the spool while the film clip is removed from the camera.

23. A method for installing film into a detachable film cassette assembly, the cassette assembly including a film clip adapted to receive a film cartridge, a winding housing attached to the film clip, a first film cover, and a second film cover, said method comprising:

coupling the film cartridge to the film clip;

feeding film from the film cartridge to the winding housing;

attaching the film clip to the first film cover; and engaging the second film cover to the film clip and the first film cover between the winding housing and the film cartridge to cover exposed film and prevent light from contacting the exposed film.

24. A method in accordance with claim 23 further comprising winding the film into the winding housing.

25. A method in accordance with claim 24, the winding housing including a spool and a crank handle, said winding the film into the winding housing comprising rotating the spool with the crank handle.

\* \* \* \* \*